Figure 1:
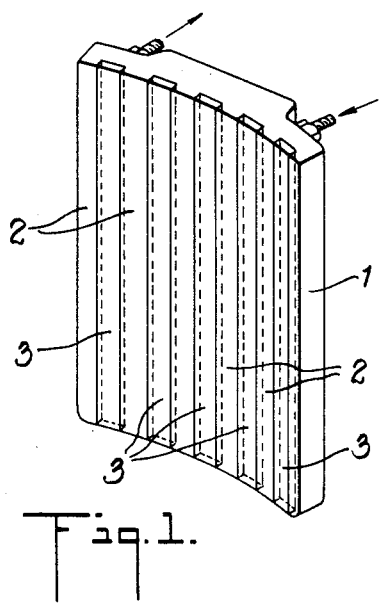

Dec. 1, 1959  K. FOYN ET AL  2,915,573
ELECTRODE HOLDER FOR ELECTRIC SMELTING FURNACE
Filed June 18, 1957

INVENTORS
KJELD FOYN &
EINAR TOMMELSTAD
BY
ATTORNEYS

United States Patent Office 2,915,573
Patented Dec. 1, 1959

2,915,573

ELECTRODE HOLDER FOR ELECTRIC SMELTING FURNACE

Kjeld Foyn, Oslo, and Einar Tommelstad, Korsvoll, Norway, assignors to Elektrokemisk A/S, Oslo, Norway, a corporation of Norway Application June 18, 1957, Serial No. 666,318

Claims priority, application Norway June 19, 1956

3 Claims. (Cl. 13—16)

The present invention relates to electrode holders for electric smelting furnaces provided with continuous electrodes. As is known, these electrodes are gradually baked in the furnace in which they are used, and each electrode will, therefore, consist of a lower baked part and an upper unbaked part where the raw electrode paste is more or less liquid. Between these parts is the baking zone, the limits of which can easily be determined by inserting a thin steel rod into the hot raw paste until it reaches the hard baked part.

The current supply for such electrodes is usually supplied by means of a plurality of water-cooled contact clamps which are pressed against the electrode, for example, by means of an external pressure ring whose pressure on the clamps is adjusted in known way.

Usually the baking zone will be inside the water-cooled electrode holder, the electrode being baked at the lower edge of the electrode holder, but raw and unbaked within its upper part. Therefore, the electrode will take shape from the upper part of the electrode holder and there will be a good electrical contact between clamps and electrode casing.

In closed furnaces, the baking zone will in many cases be situated at the lower end of the clamps and there is then a risk of the electrode breaking just below the holder as it will not have sufficient strength to stand the strains occurring. It is, therefore desirable to be able to raise the baking zone into the holder to give the electrode greater resistance against tensile and bending stresses and also greater conductivity to permit a higher amperage.

This can be attained by reducing the cooling effect of the holder resulting in a rise of the baking zone. At the same time the losses in the cooling water will be reduced. As the individual clamps are much exposed to the effect of the heat from the furnace it is not advisable to reduce the cooling action by reducing the amount of cooling water. On the contrary one must reduce the contact surface between the electrode and the holder. Thereby the cooling of the individual holder parts is completely maintained and at the same time the losses in the cooling water are reduced and the baking zone is raised.

According to the invention the clamps can be so constructed that their inner surface contacting the electrode consists of vertical strips of a material with good conductivity, for example copper. The distance between the strips must then be adjusted according to the electrode consumption, current load and other conditions in the furnace so that the cooling effect from the contact surfaces will permit the baking zone to be raised well up in the holder. It must, however, not rise too high so that the electrode will lose its plasticity and mouldability in the upper part of the holder. As previously mentioned it is essential that the electrode can be deformed according to the shape of the clamps in the upper part of the holder if it is desired to obtain a sufficiently good electrical contact between the clamps and the electrode casing. The space between the strips may, if desired, be filled with a ceramic material.

To avoid raising the baking zone too high up in the holder the clamps can be so constructed that their upper part has a smaller contact surface with the electrode than their lower part. If desired the upper part of the clamps may be coated with a ceramic material to give a good mechanical but no electrical contact with the electrode. The ceramic material must be resistant to wear, to prevent wearing off when the electrode is displaced in the holder. One may also cover it with a metal plate or the like which must then of course be electrically insulated from the current carrying part of the clamps. The baking zone can also be raised by coating the lower or middle part of the holder with a ceramic material.

Figure 2:
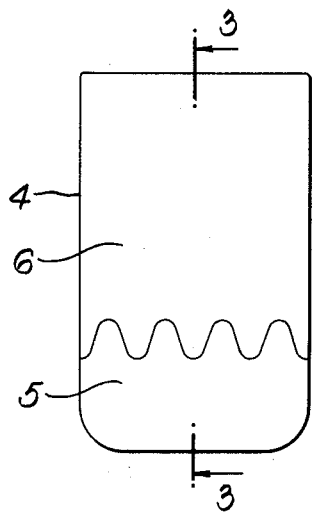
Figure 3:
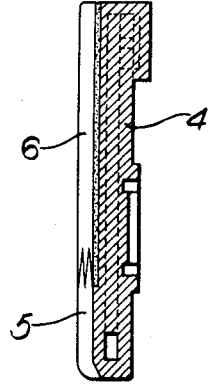

Examples of the invention are illustrated in the appended drawings Figs. 1, 2 and 3.

In Fig. 1, 1 is an electrode clamp. 2 are contact strips of well conducting material registering with the electrode. 3 are the spacings between the strips which may be filled with a ceramic material. If desired, the contact strips may be widened in their lower part so that the clamps will here form a coherent contact surface on the electrode.

The strips need not necessarily be cast together with the holder. They may also be welded to the holder.

Fig. 2 shows an example of a different type of clamps with reduced contact surfaces, and Fig. 3 a section of such a clamp. In these figures, 4 is the clamp itself and 5 its contact surface on the electrode. 6 is the ceramic coating in the upper part of the clamps. The separating line between the contact surface 5 and the ceramic coating 6 may have any suitable shape. In the figure it is shown undulated, but it may of course also be straight.

We claim:

1. An electrode holder for self-baking electrodes which consists of a water cooled contact device having an approximately continuously curved inner surface shaped to conform to the exterior surface of an electrode so that the holder may be pressed against a self-baking electrode in a zone where the electrode is still soft without unduly distorting the electrode, the body of such holder and part of its inner surface being made of metal within which is formed the cooling chamber and a part of such inner surface being made of substantially non-conductive material whereby the amount of heat conducted away from the electrode surface is reduced.

2. A holder as specified in claim 1 in which such non-conductive material is ceramic.

3. A holder as specified in claim 1, in which the metal portion of the said inner face is formed of spaced bands of highly conductive metal running parallel to the axis of curvature of the holder.

References Cited in the file of this patent

UNITED STATES PATENTS

| | | |
|---|---|---|
| 1,335,895 | Hughes | Apr. 6, 1920 |
| 1,350,876 | Mayer et al. | Aug. 24, 1920 |
| 1,552,619 | Klugh | Sept. 8, 1925 |
| 1,735,936 | Sem et al. | Nov. 19, 1929 |